(12) United States Patent
Maruno et al.

(10) Patent No.: US 11,644,545 B2
(45) Date of Patent: May 9, 2023

(54) DISTANCE MEASURING DEVICE, DISTANCE MEASURING METHOD, AND THREE-DIMENSIONAL SHAPE MEASURING APPARATUS

(71) Applicant: HITACHI, LTD., Tokyo (JP)

(72) Inventors: Kenji Maruno, Tokyo (JP); Masahiro Watanabe, Tokyo (JP); Yuta Urano, Tokyo (JP); Tatsuo Hariyama, Tokyo (JP); Atsushi Taniguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 972 days.

(21) Appl. No.: 16/507,124

(22) Filed: Jul. 10, 2019

(65) Prior Publication Data

US 2020/0018823 A1 Jan. 16, 2020

(30) Foreign Application Priority Data

Jul. 11, 2018 (JP) .............................. JP2018-131707

(51) Int. Cl.
  *G01S 7/484* (2006.01)
  *G01S 17/10* (2020.01)
  *G02B 27/28* (2006.01)

(52) U.S. Cl.
  CPC .............. *G01S 7/484* (2013.01); *G01S 17/10* (2013.01); *G02B 27/286* (2013.01)

(58) Field of Classification Search
  CPC .......... G01S 7/484; G01S 17/10; G01S 17/34; G01S 7/481; G01S 7/499; G02B 27/286; G02B 27/281
  See application file for complete search history.

(56) References Cited

U.S. PATENT DOCUMENTS

| 5,703,718 A | 12/1997 | Ohtomo et al. |
| 2007/0146676 A1* | 6/2007 | Tanitsu ................. G02B 26/00 355/71 |

(Continued)

FOREIGN PATENT DOCUMENTS

JP  2007-271601 A  10/2007

OTHER PUBLICATIONS

Canadian Office Action dated Sep. 29, 2020 for Canadian Patent Application No. 3,048,558.

*Primary Examiner* — Maria E Vazquez Colon
(74) *Attorney, Agent, or Firm* — Volpe Koenig

(57) ABSTRACT

A distance measuring device includes a light emitting unit that outputs a measurement light, a first polarization state control unit that controls a polarization state of the measurement light output from the light emitting unit, a second polarization state control unit that controls the polarization state of the measurement light of which a polarization state is controlled by the first polarization state control unit, and an optical path switching element that selects an emission direction of the measurement light of which a polarization state is controlled by the second polarization state control unit, in which the second polarization state control unit controls the polarization state of the measurement light so that the measurement lights are emitted from the optical path switching element in a plurality of the emission directions, and the optical path switching element receives a reflected light obtained by reflecting the emitted measurement light by an object.

9 Claims, 13 Drawing Sheets

(56) References Cited

U.S. PATENT DOCUMENTS

| | | | |
|---|---|---|---|
| 2014/0362385 A1* | 12/2014 | Uemura | G01B 11/245 356/601 |
| 2015/0055115 A1* | 2/2015 | Pedersen | G01S 17/58 356/4.01 |
| 2017/0242100 A1* | 8/2017 | Hinokuma | G01S 17/95 |

* cited by examiner

DISTANCE MEASURING DEVICE, DISTANCE MEASURING METHOD, AND THREE-DIMENSIONAL SHAPE MEASURING APPARATUS

TECHNICAL FIELD

The present invention relates to a distance measuring device, a distance measuring method, and a three-dimensional shape measuring apparatus.

BACKGROUND ART

As a technique relating to an optical measuring instrument, for example, PTL 1 describes "A rod-shaped shaft (support member) 36 fixedly and integrally provided in a housing portion 34, a reflection mirror 37 held by the shaft 36 in a movable state with the shaft 36 as a center, and a holding member 35 for holding the reflection mirror 37 at a predetermined position before and after a pivot are disposed in the housing portion 34. The shaft 36, the reflection mirror 37, and the holding member 35 constitute a direction control unit for changing a traveling direction of a light for measurement output from a light source 38 to a predetermined direction (for example, 90 degrees).", "The holding member 35 holds the reflection mirror 37 at a first position where the light for measurement from the light source 38 is not reflected before the reflection mirror 37 pivots about the shaft 36. In addition, the holding member 35 functions to hold the reflection mirror 37 at the second position, after the reflection mirror 37 is rotated about the shaft 36 by a predetermined angle (for example, 45 degrees) to move to a second position where the traveling direction of the light for measurement from the light source 38 is changed to a predetermined direction (90 degrees).", and "As a result, the reflection mirror 37 does not change the traveling direction of the light for measurement from the light source 38 at the first position, and operates to change the traveling direction of the light for measurement from the light source 38 to a predetermined direction at the second position.".

CITATION LIST

Patent Literature

PTL 1: JP-A-2007-271601

SUMMARY OF INVENTION

Technical Problem

In a case of measuring a shape of a three-dimensional object by irradiating light, by changing a direction of irradiation, measurement can be performed while suppressing a movement of a measurement unit that emits light.

In the technique described in PTL 1, the direction of irradiation is changed by moving a mirror installed in the housing portion. In order to move the mirror in the housing portion, miniaturizing of the housing portion is limited. In this case, especially when measuring a narrow portion, the measurement may be limited.

The present invention has been made in view of such a situation, and it is an object to be able to measure a distance of a narrow portion.

Solution to Problem

Although the present application includes a plurality of means to solve at least a portion of the problem, if an example is given, it is as follows. In order to solve the above problems, a distance measuring device according to an aspect of the present invention includes a light emitting unit that outputs a measurement light, a first polarization state control unit that controls a polarization state of the measurement light output from the light emitting unit, a second polarization state control unit that controls the polarization state of the measurement light of which apolarization state is controlled by the first polarization state control unit, and an optical path switching element that selects an emission direction of the measurement light of which a polarization state is controlled by the second polarization state control unit, in which the second polarization state control unit controls the polarization state of the measurement light so that the measurement lights are emitted from the optical path switching element in a plurality of emission directions, and the optical path switching element receives a reflected light obtained by reflecting the emitted measurement light by an object.

Advantageous Effects of Invention

According to the present invention, it is possible to measure a distance of a narrow portion.

Problems, configurations, and effects other than those described above will be apparent from the description of the embodiments below.

DESCRIPTION OF EMBODIMENTS

Figure 1:
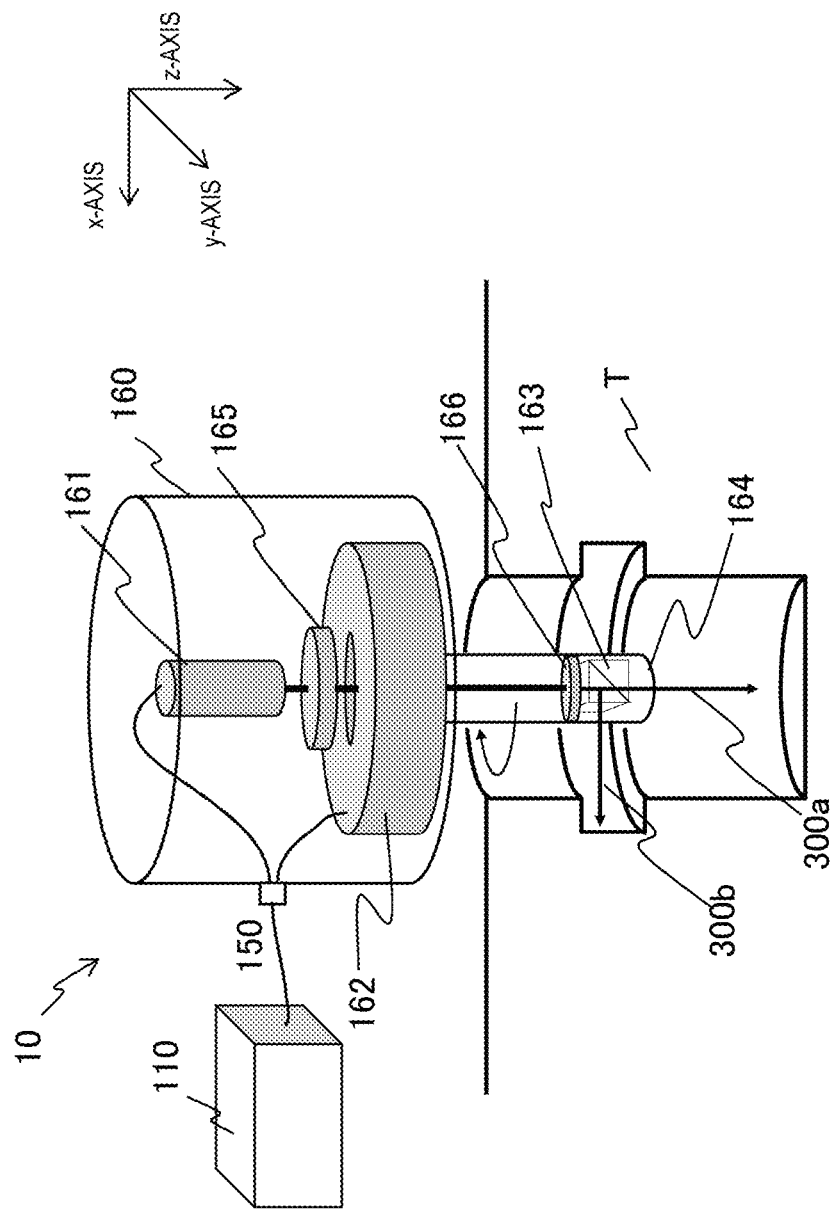
FIG. 1 is a schematic view illustrating a configuration example of a distance measuring device according to an embodiment of the present invention.

Hereinafter, a plurality of embodiments according to the present invention will be described based on the drawings. In all the drawings for describing each embodiment, the same reference numeral is attached to the same member in principle, and the repetitive description thereof will not be repeated. In addition, in the following embodiments, it goes without saying that the constituent elements (including element steps and the like) are not necessarily essential except in a case of being particularly clearly stated and in a case of being considered to be obviously essential in principle. In addition, when saying "formed of A", "containing of A", "having A", and "including A", except in a case of being particularly stated that only that element is specified, it goes without saying that it does not exclude other elements. Similarly, in the following embodiments, when referring to the shapes, positional relationships, and the like of components, except in a case of being particularly clearly stated and in a case of being obviously considered not to be in principle, substantially similar or similar shapes and the like are included.

<Configuration Example of Distance Measuring Device According to One Embodiment of Present Invention>

FIG. 1 is a schematic view illustrating a configuration example of a distance measuring device 10 according to an embodiment of the present invention. The distance measuring device 10 is configured to connect a distance measuring control unit 110 and a measurement probe 160 via a connection cable 150.

The distance measuring control unit 110 generates measurement light and outputs the measurement light to the measurement probe 160 via the connection cable 150. The connection cable 150 is made of, for example, an optical fiber, and guides the measurement light output from the distance measuring control unit 110 to the measurement probe 160. The measurement probe 160 irradiates an object T with the measurement light, receives the measurement light (reflected light) reflected by the object T, and outputs the received reflected light to the distance measuring control unit 110 via the connection cable 150.

The measurement probe 160 includes a lens unit 161, a rotation unit 162, an optical path switching element 163, a measurement probe tip end unit 164, a first polarization state control unit 165, and a second polarization state control unit 166.

The lens unit 161 focuses the measurement light guided from the distance measuring control unit 110 via the connection cable 150 and guides the measurement light to the first polarization state control unit 165. The rotation unit 162 has a rotation drive unit such as a motor. The rotation unit 162 rotationally drives a motor or the like according to control from a distance calculation unit (not illustrated) built in a control device 210 (FIG. 6), and simultaneously rotates the second polarization state control unit 166 and the optical path switching element 163 about a rotation axis parallel to the measurement light output from the lens unit 161.

Figure 5:
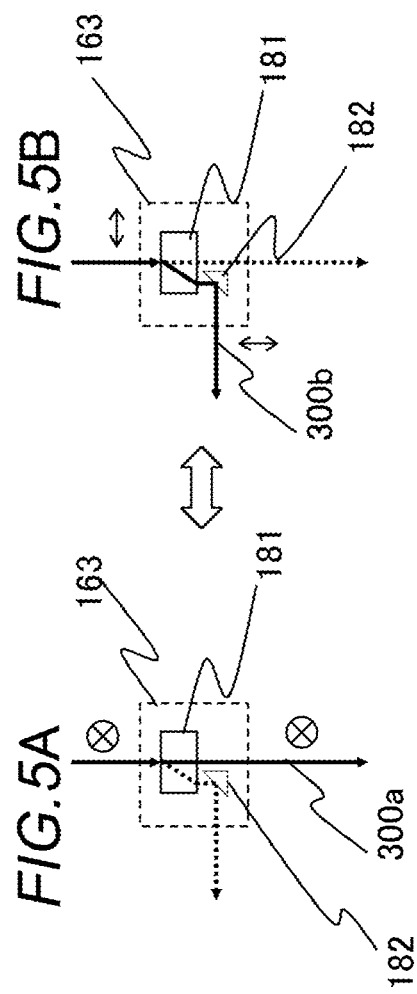
FIGS. 5A and 5B are a diagram for describing an operation by a combination of a birefringence plate as an example of the optical path switching element and a mirror.

The optical path switching element 163 is made of, for example, a polarization beam splitter 180 (FIGS. 2A and 2B) or a combination of a birefringence plate 181 and a mirror 182 (FIGS. 5A and 5B). The optical path switching element 163 selectively emits the measurement light of which a circularly polarized light direction is controlled by a linear polarization switching element 302 (FIG. 6) and the first polarization state control unit 165 according to the direction of the polarization. Specifically, the optical path switching element 163 emits the light toward at least one of a first direction 300a (z-axis direction) that is the same as the traveling direction of the measurement light output from the lens unit 161 and a second direction 300b (direction parallel to xy plane) substantially orthogonal to the first direction 300a.

The measurement probe tip end unit 164 locks the second polarization state control unit 166 and the optical path switching element 163, and passes the light emitted from the optical path switching element 163 in the first direction 300a or the second direction 300b. The measurement probe tip end unit 164 is, for example, a tubular shape having an opening portion in the first direction 300a, is made of a material that transmits light, and locks the optical path switching element 163 to at least a portion of the inner wall. The measurement probe tip end unit 164 rotates about the rotation axis parallel to the measurement light output from the lens unit 161, and the second polarization state control unit 166 and the optical path switching element 163 rotate as the measurement probe tip end unit 164 rotates. The measurement probe tip end unit 164 points from a rotation position of the rotation unit 162 to a position where the optical path switching element 163 is locked, and rotates with the control of the rotation unit 162.

The structure of the measurement probe tip end unit 164 is not limited to the example described above. For example, the measurement probe tip end unit 164 may lock the second polarization state control unit 166 and the optical path switching element 163 to one or more columns, and the optical path switching element 163 may be rotated as the column is driven. In addition, the measurement probe tip end unit 164 may be formed of, for example, a transparent two-layer cylinder, the second polarization state control unit 166 and the optical path switching element 163 may be locked to the inner layer side cylinder, and the second polarization state control unit 166 and the optical path switching element 163 may be rotated. In addition, the second polarization state control unit 166 and the optical path switching element 163 may be adhered directly and locked to the measurement probe tip end unit 164, or the second polarization state control unit 166 and the optical path switching element 163 may be individually locked to the measurement probe tip end unit 164.

The first polarization state control unit 165 is formed of, for example, a quarter wavelength plate, a liquid crystal element, or a fiber type polarization control element. The first polarization state control unit 165 is fixed inside the measurement probe 160 and does not rotate. The first polarization state control unit 165 controls the polarization of the measurement light output from the distance measuring control unit 110, and changes, for example, the circularly polarized light direction of the measurement light. The detailed operation of the first polarization state control unit 165 will be described later.

The second polarization state control unit 166 is formed of, for example, a quarter wavelength plate. As described above, the second polarization state control unit 166 is rotated by the rotation unit 162 about the optical path switching element 163 and the first direction 300a as the rotation axis. The second polarization state control unit 166 outputs the polarization state of the measurement light controlled by the first polarization state control unit 165 to the optical path switching element 163 while maintaining a constant state with respect to the optical path switching element 163.

In the distance measuring device 10, the measurement light output from the distance measuring control unit 110 reaches the first polarization state control unit 165 via the connection cable 150 and the lens unit 161, and the polarization is controlled by the first polarization state control unit 165. The measurement light of which polarization is controlled by the first polarization state control unit 165 is again controlled in polarization by the second polarization state control unit 166, and reaches the optical path switching element 163, and is emitted in the first direction 300a or the second direction 300b according to the polarization.

The light emitted from the optical path switching element 163 reaches the object T, and the light reflected or scattered by the object T travels in a path opposite to that at the time of emission, that is, in the order of the optical path switching element 163, the second polarization state control unit 166, the first polarization state control unit 165, the lens unit 161, and the connection cable 150, to reach the distance measuring control unit 110. The distance measuring control unit 110 converts the reached measurement light into a predetermined electric signal and outputs the electric signal to the control device 210. In the control device 210, a built-in distance calculation unit calculates the distance to the object T based on a predetermined electric signal input from the distance measuring control unit 110.

In a case where the object T has, for example, a cylindrical shape, the depth to the bottom of the cylindrical shape can be measured by using the measurement light emitted in the first direction 300a. In addition, for example, the shape of the side surface of the cylindrical shape can be measured by using the measurement light emitted in the second direction 300b.

Figure 2:
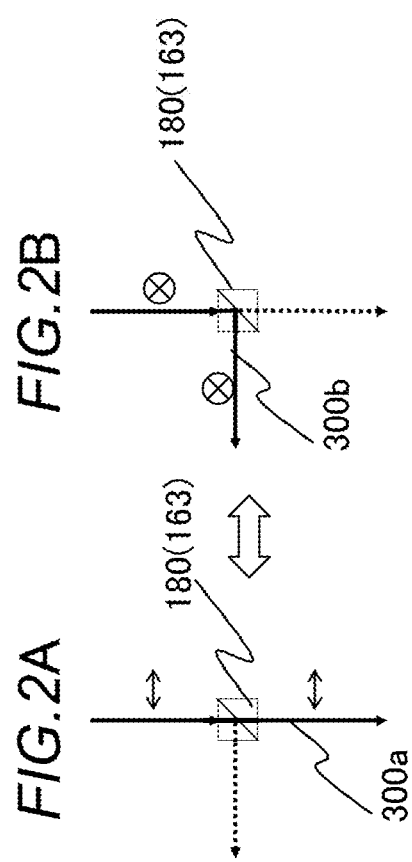
FIGS. 2A and 2B are a diagram for describing an operation of a polarization beam splitter as an example of an optical path switching element.

Next, the operation of the optical path switching element 163 will be described. FIGS. 2A and 2B are a diagram for describing the operation in a case where the polarization beam splitter 180 is used as the optical path switching element 163. FIG. 2A illustrates a state where the measurement light as linearly polarized light oscillates in a horizontal direction of the drawing. FIG. 2B illustrates a state where the measurement light as linearly polarized light oscillates in the depth direction (direction perpendicular to drawing) of the drawing.

In the state illustrated in FIG. 2A, the incident measurement light passes through the reflection surface of the polarization beam splitter 180, and travels in the same first direction 300a as the incident direction. The light reflected by the object T travels the same path backward and reaches the distance measuring control unit 110.

In addition, in the state illustrated in FIG. 2B, the incident measurement light is reflected by the reflection surface of the polarization beam splitter 180, and travels in the second direction 300b substantially orthogonal to the incident direction of the measurement light. In the light traveling in the second direction 300b, the light reflected by the object T travels the same path backward in the same manner as the light traveling in the first direction 300a, and reaches the distance measuring control unit 110.

When the polarization state of the measurement light is controlled by a polarization stabilization unit 301 to be described later, the linear polarization switching element 302, the first polarization state control unit 165, and the second polarization state control unit 166 so as to maintain a predetermined angle with respect to the optical path switching element 163 utilizing this property, it is possible to maintain the traveling direction of the measurement light in the first direction 300a or the second direction 300b.

That is, by controlling the polarization of the measurement light by the polarization stabilization unit 301, the linear polarization switching element 302, the first polarization state control unit 165, and the second polarization state control unit 166, the traveling direction of the measurement light can be switched to the first direction 300a or the second direction 300b.

Figure 3:
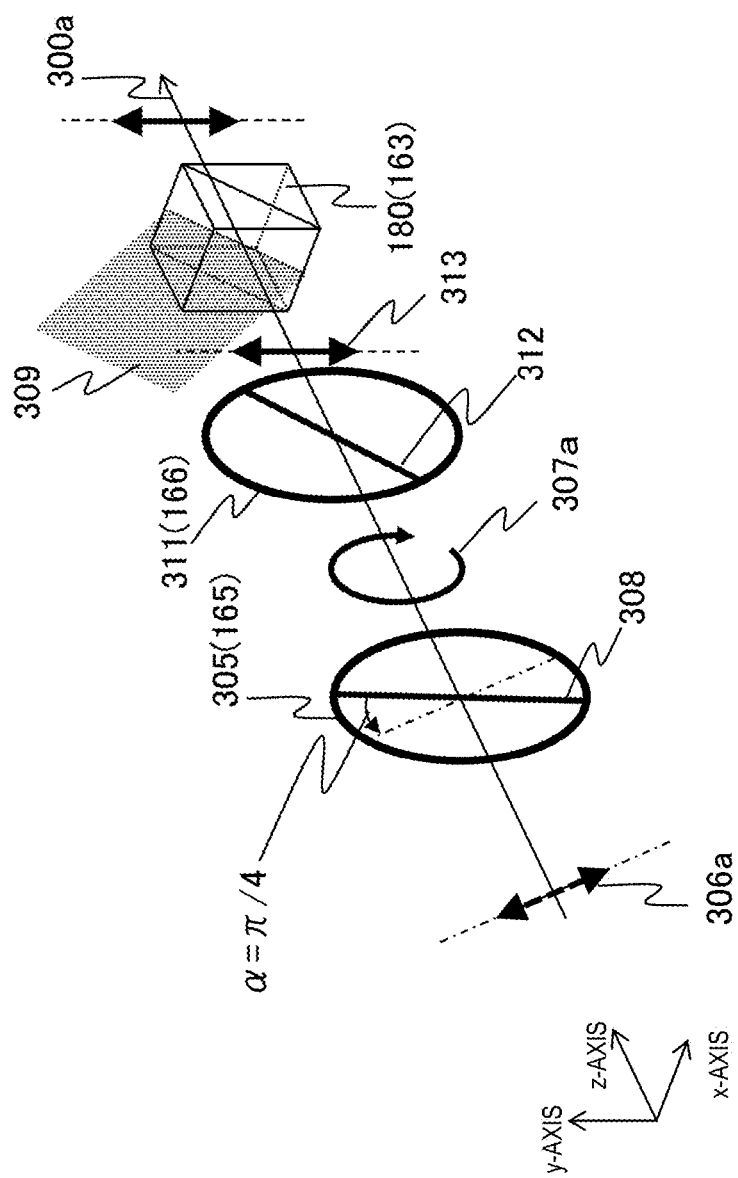
FIG. 3 is a diagram for describing a relationship among a first polarization state control unit, a second polarization state control unit, and the optical path switching element.
Figure 4:
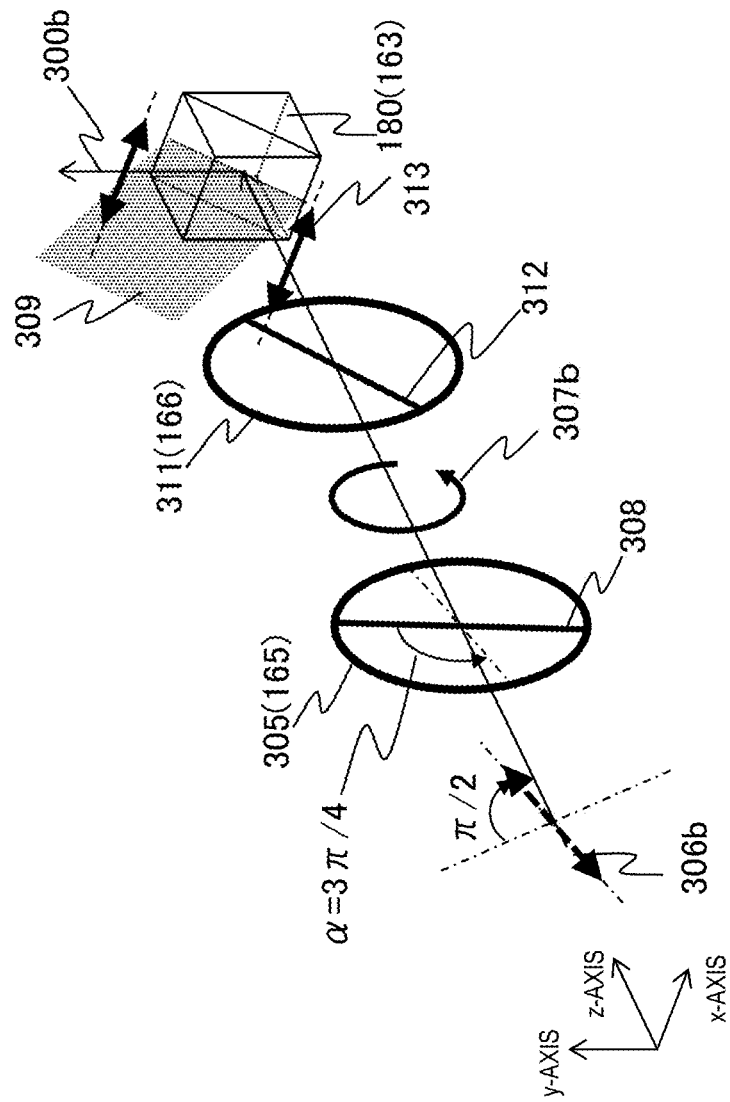
FIG. 4 is a diagram for describing a relationship among the first polarization state control unit, the second polarization state control unit, and the optical path switching element.

Next, FIGS. 3 and 4 are diagrams for describing a relationship among the first polarization state control unit 165, the second polarization state control unit 166, and the optical path switching element 163. However, in FIGS. 3 and 4, a quarter wavelength plate 305 is adopted as the first polarization state control unit 165, a quarter wavelength plate 311 is adopted as the second polarization state control unit 166, and the polarization beam splitter 180 is adopted as the optical path switching element 163.

In a case where the optical axis of the quarter wavelength plate 305 is used as a reference, as illustrated in FIG. 3, when the angle $\alpha$ in an oscillation direction of the linearly polarized light in the measurement light incident on the quarter wavelength plate 305 is $\pi/4$, the measurement light emitted from the quarter wavelength plate 305 has a circular polarization state (left circularly polarized light) 307a that rotates clockwise when viewed in the traveling direction.

In addition, as illustrated in FIG. 4, when the angle $\alpha$ in the oscillation direction of the linearly polarized light in the measurement light incident on the quarter wavelength plate 305 is $3\pi/4$, the measurement light emitted from the quarter wavelength plate 305 has a circular polarization state (right circularly polarized light) 307b that rotates counterclockwise when viewed in the traveling direction.

Normally, the quarter wavelength plate has a property of emitting linearly polarized light that oscillates in a direction according to the rotation direction of circularly polarized light when the light of circularly polarized light is incident. Therefore, as illustrated in FIG. 3, when the left circularly polarized light 307a is incident on the quarter wavelength plate 311, the linearly polarized light having an angle of $\pi/4$ with respect to the optical axis of the quarter wavelength plate 311 is emitted. In addition, as illustrated in FIG. 4, when the right circularly polarized light 307b is incident on the quarter wavelength plate 311, the linearly polarized light having an angle of $3\pi/4$ with respect to the optical axis of the quarter wavelength plate 311 is emitted.

The polarization beam splitter 180 disposed on the rear portion of the quarter wavelength plate 311 transmits the linearly polarized light in the oscillation direction parallel to an incident surface 309, that is, emits the linearly polarized light in the first direction 300a. In addition, the polarization beam splitter 180 reflects the linearly polarized light in the oscillation direction forming an angle of $\pi/2$ with respect to the incident surface 309, that is, emits the linearly polarized light in the second direction 300b.

The quarter wavelength plate B311 and the polarization beam splitter 180 are rotated by the rotation unit 162. Therefore, if the quarter wavelength plate B311 and the polarization beam splitter 180 are rotated in a state where the quarter wavelength plate B311 and the polarization beam splitter 180 are locked to the measurement probe tip end unit 164, respectively, so that the angle between the optical axis of quarter wavelength plate B311 and the incident surface of the polarization beam splitter 180 is $\pi/4$, the distance measurement by the measurement light traveling in the first direction 300a and the distance measurement by the measurement light traveling in the second direction 300b can be performed.

Figure 6:
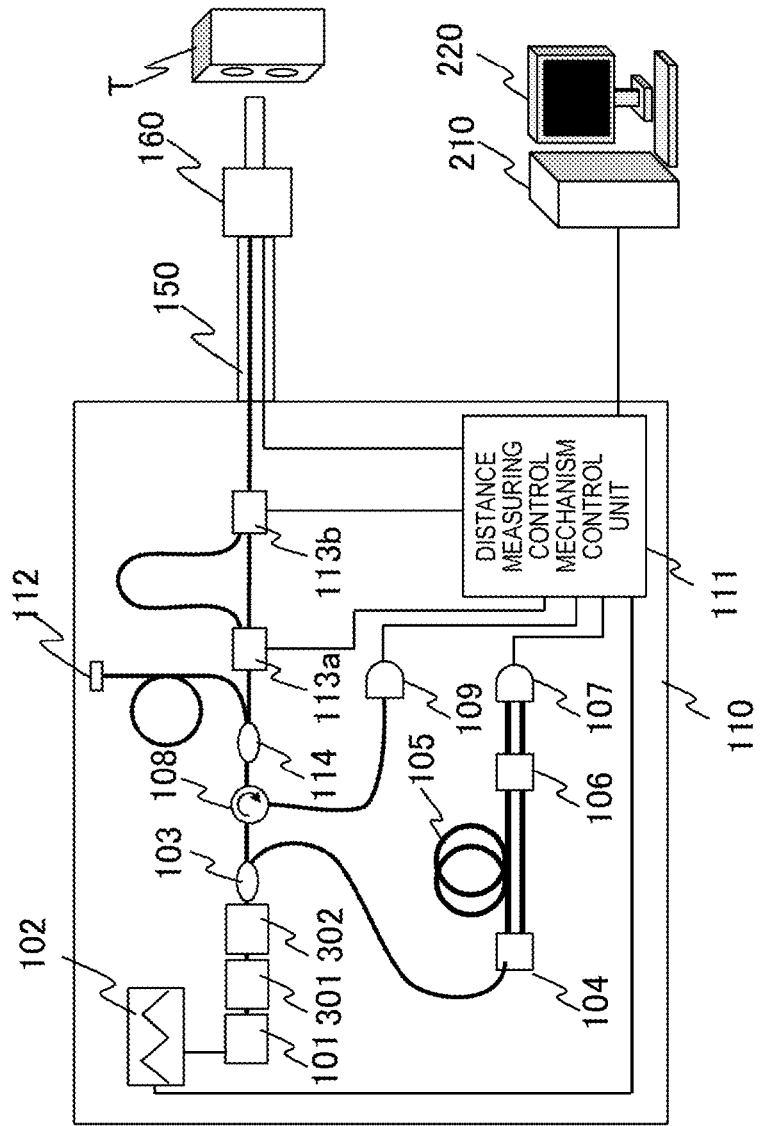
FIG. 6 is a diagram illustrating a first configuration example of a distance measuring control unit.

Incidentally, the switching of the oscillation direction of the linearly polarized light in the measurement light incident on the quarter wavelength plate 305 is performed by the linear polarization switching element 302 (FIG. 6). In a case where no voltage is applied to the linear polarization switching element 302, as illustrated in FIG. 3, the linear polarization switching element 302 adjusts the oscillation direction of the linearly polarized light in the measurement light incident on the quarter wavelength plate 305 to a first measurement light oscillation direction 306a. In addition, in a case where a voltage is applied to the linear polarization switching element 302, as illustrated in FIG. 4, the linear polarization switching element 302 adjusts the oscillation direction of the linearly polarized light in the measurement light incident on the quarter wavelength plate 305 is a second measurement light oscillation direction 306b. That is, by electrically switching and controlling the linear polarization switching element 302, it is possible to switch from the measurement probe tip end unit 164 to the first direction 300a or the second direction 300b to emit the measurement light.

For example, as illustrated in FIG. 3, in a case of irradiating in the first direction 300a with the measurement light, the voltage application to the linear polarization switching element 302 may be stopped so that the oscillation direction of the linearly polarized light in the measurement light is the first measurement light oscillation direction 306a having an inclination of π/4 with respect to a main axis 308 of the quarter wavelength plate A. As a result, the measurement light is converted into the left circular polarization state by the quarter wavelength plate A305, and thereafter converted into linearly polarized light oscillating parallel to the incident surface 309 of the polarization beam splitter 180 by the quarter wavelength plate B311 and emitted in the first direction 300a.

In addition, for example, as illustrated in FIG. 4, in a case of irradiating in the second direction 300b with the measurement light, the voltage application to the linear polarization switching element 302 may be performed so that the oscillation direction of the linearly polarized light in the measurement light is the second measurement light oscillation direction 306b having an inclination of 3π/4 with respect to the main axis 308 of the quarter wavelength plate A. As a result, the measurement light is converted into the right circular polarization state by the quarter wavelength plate A305, and thereafter converted into linearly polarized light oscillating perpendicular to the incident surface 309 of the polarization beam splitter 180 by the quarter wavelength plate B311 and emitted in the second direction 300b.

Although the example in which the quarter wavelength plate 305 is adopted as the first polarization state control unit 165 is described so far, the liquid crystal element may be adopted as the first polarization state control unit 165. In that case, the first polarization state control unit 165 can change the polarization direction of the measurement light to be output by controlling the voltage applied to the liquid crystal element as the first polarization state control unit 165 and controlling an optical rotation of the liquid crystal element.

In addition, a fiber type polarization control element may be adopted as the first polarization state control unit 165. In that case, if twisting or compression is applied to the fiber type polarization control element as the first polarization state control unit 165, the polarization direction of the measurement light output from the first polarization state control unit 165 can be controlled by induction of birefringence.

Next, FIGS. 5A and 5B are a diagram for describing the operation in a case of the combination of the birefringence plate 181 and the mirror 182 is used for the optical path switching element 163. FIG. 5A illustrates a state where the measurement light as the linearly polarized light oscillates in the depth direction of the drawing (direction perpendicular to drawing). FIG. 5B illustrates a state where the measurement light as the linearly polarized light oscillates in the horizontal direction of drawing.

A birefringence plate 181 has the property of shifting the optical path according to the polarization state of the measurement light. Therefore, the birefringence plate 181 forming the optical path switching element 163 is installed to straighten the measurement light of the linearly polarized light oscillating in the depth direction of the drawing as illustrated in FIG. 5A, and to shift the optical path of the measurement light of the linearly polarized light oscillating in the horizontal direction of the drawing as illustrated in FIG. 5B. Furthermore, the mirror 182 forming the optical path switching element 163 is disposed on the optical path shifted by the birefringence plate 181 to change an emission direction of the shifted measurement light.

As a result, as in the case where the polarization beam splitter 180 is used for the optical path switching element 163 (FIGS. 2A and 2B), it is possible to selectively emit in the first direction 300a having the same optical axis as the measurement light emitted from the lens unit 161 or in the second direction 300b different in the optical axis from the first direction 300a with the light.

However, it is required to note that the relationship between the polarization direction and the light emission direction is reversed between the case where the polarization beam splitter 180 is used as the optical path switching element 163 (FIGS. 2A and 2B) and the case where the combination of the birefringence plate 181 and the mirror 182 is used as the optical path switching element 163 (FIGS. 5A and 5B).

As described above, the measurement probe 160 can emit in different directions with the measurement light from the optical path switching element 163 of the measurement probe tip end unit 164. Therefore, for example, as compared with a case where the emission direction of the measurement light is selectively changed by providing the mirror inside the measurement probe tip end unit 164 and driving the mirror, the measurement probe tip end unit 164 can be miniaturized as much as the mirror is unnecessary.

Next, a configuration example of the distance measuring control unit 110 will be described.

<First Configuration Example of Distance Measuring Control Unit 110>

FIG. 6 illustrates a first configuration example of the distance measuring control unit 110. The first configuration example of the distance measuring control unit 110 measures the distance to the object T using a frequency modulated continuous waves (FMCW) or a swept-source optical coherence tomography (SS-OCT) (or wavelength sweep OCT) as a distance measuring method. Although the basic principles of FMCW and SS-OCT are common, FMCW is mainly used for long distance measurement using a light source with a long coherence length, and SS-OCT is mainly used for the measurement of fine structures using a light source with a short coherence length.

The first configuration example of the distance measuring control unit 110 is connected to the control device 210 in addition to the measurement probe 160. The control device 210 is provided with a distance calculation unit (not illustrated) that calculates a distance to the object T using a predetermined electric signal input from the distance measuring control unit 110. The distance calculation unit may be provided in the distance measuring control unit 110. The control device 210 allows a display device 220 to display the calculation result of the distance to the object T. In addition, the control device 210 may be connected to be able to directly communicate with the measurement probe 160 without via the distance measuring control unit 110.

The first configuration example of the distance measuring control unit 110 includes a light emitting unit 101, an oscillating unit 102, optical fiber couplers 103, 104, 106, and 114, an optical fiber 105, light receiving units 107 and 109, an optical circulator 108, a reference mirror 112, the optical switches 113a and 113b, a distance measuring control mechanism control unit 111, a polarization stabilization unit 301, and a linear polarization switching element 302.

The oscillating unit 102 injects a triangular wave current to the light emitting unit 101 based on a sweep waveform signal from the distance measuring control mechanism control unit 111, and modulates the drive current. The light emitting unit 101 generates frequency modulated (FM) light temporally frequency-swept at a constant modulation speed by the modulated drive current, and outputs the generated light to the polarization stabilization unit 301.

The light emitting unit 101 may be configured as a semiconductor laser device with an external resonator, and the resonant wavelength of the light emitting unit 101 may be changed by a triangular wave control signal from the oscillating unit 102. Also in this case, the light emitting unit 101 can generate FM light temporally frequency-swept.

The polarization stabilization unit 301 normally stabilizes the polarization state of the FM light input from the light emitting unit 101 as a linear polarization state in a constant direction and outputs the FM light to the linear polarization switching element 302. The linear polarization switching element 302 outputs the direction of the linearly polarized light of the FM light input from the polarization stabilization unit 301 as it is to the rear portion or rotates the direction by $\pi/2$ and outputs the direction to the rear portion by applying a voltage to the built-in liquid crystal element.

Since the polarization stabilization unit 301 and the linear polarization switching element 302 are used to output the linearly polarized light having a desired oscillation direction, a combination of a general polarization state analyzer and a polarization state generator can be adopted.

The light (linearly polarized light) output from the linear polarization switching element 302 is incident on the optical fiber coupler 103. The optical fiber coupler 103 splits the incident light into two, and outputs one to the optical fiber coupler 104 of the reference optical system. The optical fiber couplers 103, 104, and 114 may be, for example, beam splitters.

The light incident on the optical fiber coupler 104 is split into two, and after a predetermined optical path difference is provided for one of these, the light is multiplexed by the optical fiber coupler 106 and received by the light receiving unit 107. The light receiving unit 107 functions as a Mach-Zehnder interferometer, and detects a constant reference beat signal proportional to the optical path difference.

The other of the light split into two by the optical fiber coupler 103 is guided to the optical fiber coupler 114 by the optical circulator 108, and split into two by the optical fiber coupler 114. One is reflected by the reference mirror 112 to be a reference light, and the other is output to the measurement probe 160 via the optical switches 113a and 113b to be irradiated the object T. The operation of the optical switches 113a and 113b will be described later. The reflected light (measurement light) reflected by the object T is returned to the distance measuring control unit 110 via the connection cable 150.

The measurement light returned to the distance measuring control unit 110 passes through the optical switches 113a and 113b, is multiplexed with the reference light reflected by the reference mirror 112 by the optical fiber coupler 114, and is guided to the light receiving unit 109 by the optical circulator 108. The light receiving unit 109 detects a measurement beat signal generated by the interference between the reference light and the measurement light.

The distance measuring control mechanism control unit 111 performs A/D conversion of the measurement beat signal detected by the light receiving unit 109 using the reference beat signal detected by the light receiving unit 107 as a sampling clock. Alternatively, the distance measuring control mechanism control unit 111 samples the reference beat signal and the measurement beat signal at a constant sampling clock.

More specifically, the distance measuring control mechanism control unit 111 performs Hilbert transform of the reference beat signal to generate a signal of which a phase is shifted by $\pi/2$, a local phase of the signal is obtained from the reference signal before and after Hilbert transform, and the phase is interpolated to determine the timing at which the reference signal has a constant phase. Furthermore, the distance measuring control mechanism control unit 111 interpolates and samples the measurement beat signal in accordance with the timing to resample the measurement signal based on the reference signal.

The distance measuring control mechanism control unit 111 can obtain similar result even if the measurement signal is sampled and A/D converted using the reference beat signal as a sampling clock by the built-in AD/DA converter.

Regarding the analysis of the beat signal, although a time difference $\Delta t$ exists in the arrival timing of the measurement light and the reference light to the light receiving unit 109, since the frequency of the light source changes during this time, the measurement beat signal of the beat frequency fb equal to the frequency difference due to this change is detected. Assuming that the frequency sweep width is $\Delta v$ and the time required for modulation by $\Delta v$ is T, there is a relationship of the following equation (1)

[Math. 1]

$$\Delta t = \frac{T}{2\Delta v} f_b \qquad (1)$$

Since the distance L to the object T is half of the distance traveled by light during $\Delta t$, it can be calculated as in the following equation (2) using the light velocity c in the atmosphere.

[Math. 2]

$$L = \frac{cT}{2\Delta v} f_b \qquad (2)$$

When the first fourier transform (FFT) is performed on the measurement signal obtained by the distance measuring control mechanism control unit 111, and the peak position and the size thereof are obtained, the reflection position and the reflection light amount of the object T can be known. For example, in the OCT device, since it is desired to visualize the scattering position and the size of scattering of a translucent body such as a living body, the amplitude spectrum of the FFT can be used as it is. In the present embodiment, in order to obtain the position of the surface of the object T accurately, interpolation as illustrated in FIG. 7 is performed to increase the distance detection resolution.

Figure 7:
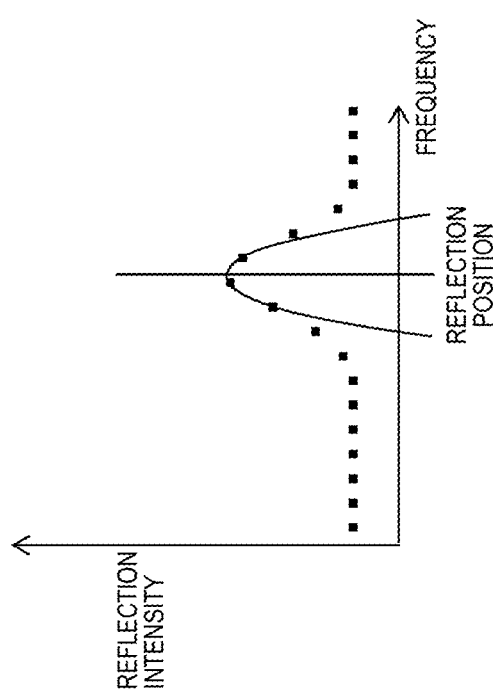
FIG. 7 is a graph for describing an example of a method of determining a reflection position on a surface of an object T from a reflection intensity profile.

FIG. 7 is a graph for describing an example of a method of determining the reflection position on the surface of the object T from the reflection intensity profile. In FIG. 7, the horizontal axis indicates the frequency of the FFT, and the vertical axis indicates the reflection intensity. As illustrated in FIG. 7, discrete data is obtained near the peak of the reflection intensity. The interval between points, that is, the distance resolution, is $c/2\Delta v$. In a case of SS-OCT, the normal wavelength is 1300 nm, the sweep width is 100 nm, and the frequency sweep width $\Delta v$ is 17.8 THz, so that the distance resolution $c/2\Delta v$ is 8.4 m.

In addition, in a case of FMCW, the normal wavelength is 1500 nm, the sweep width is 2 nm, and the frequency sweep width $\Delta v$ is 267 GHz, so that the distance resolution $c/2\Delta v$ is 0.56 mm. On the other hand, when a function such as a quadratic function or a Gaussian function is fitted using three or more points near the peak as illustrated in FIG. 7 and interpolation is performed using values near the peak of the fitted function, it is possible to increase the resolution to approximately $1/10$.

Next, the optical switches 113a and 113b forming the distance measuring control unit 110 will be described. The optical switches 113a and 113b are controlled to be switched by the distance measuring control mechanism control unit 111. In order to obtain a beat signal due to interference between the reference light and the measurement light, the difference between the optical path length from the optical fiber coupler 114 to the reference mirror 112 and the optical path length from the optical fiber coupler 114 to the object T is required to be the coherence length of the light emitting unit 101 or less. In order to keep this condition, the optical switch 113a and the optical switch 113b are simultaneously switched according to the distance from the optical fiber coupler 114 to the object T, and the length of the optical fiber between the switches is changed.

In addition, in a case where the difference between the optical path length from the optical fiber coupler 114 to the reference mirror 112 and the optical path length from the optical fiber coupler 114 to the object T is too long, that is, in a case where the coherence length is long, the beat frequency is too high to be detected by the light receiving unit 109. Therefore, the optical switch 113a and the optical switch 113b are simultaneously switched to change the length of the optical fiber between the switches so that the beat frequency is a frequency detectable by the light receiving unit 109.

In the first configuration example illustrated in FIG. 6, the optical switches 113a and 113b switch two optical fibers having different lengths, and three or more optical fibers having different lengths may be switched according to the range of the measurement target. In addition, the timing at which the optical switches 113a and 113b switch the optical fibers may be constant, or may be changed according to the conditions such as the distance from the optical path switching element 163 of the object T. For example, the optical switch 113a and the optical switch 113b may be switched every one rotation in synchronization with the rotation of the optical path switching element 163.

In addition, although it is described that the optical fiber is used for the optical path, once light is propagated in free space using an optical fiber collimator or the like, the light may be switched by the mirror or the like, or the mirror may be moved to change the optical path length.

In addition, an optical switch similar to the optical switches 113a and 113b may be provided in the optical path between the optical fiber coupler 114 used for branching and the reference mirror 112, and the length of the optical fiber may be switched.

In the first configuration example illustrated in FIG. 6, the optical path from the optical fiber coupler 114 to the optical switch 113b is installed in the distance measuring control unit 110. However, these optical paths may be installed in the measurement probe 160 instead of the distance measuring control unit 110.

In addition, a distance measuring method performed using the distance measuring control unit 110 is not limited to the above-described example. For example, it is possible to use a method of irradiating the object T with pulse or burst light and measuring the time until the pulse or burst is received as in a time of flight (TOF) method, and a method of irradiating the object T with light continuously modulated in intensity and measuring the phase of the received signal as in a Phase•Shift method or an optical comb distance measuring method. In addition, a distance may be measured by measuring defocus, or a white confocal method, an astigmatism method, a knife edge method, or a conoscopic holographic method may be adopted.

<Second Configuration Example of Distance Measuring Control Unit 110>

Figure 8:
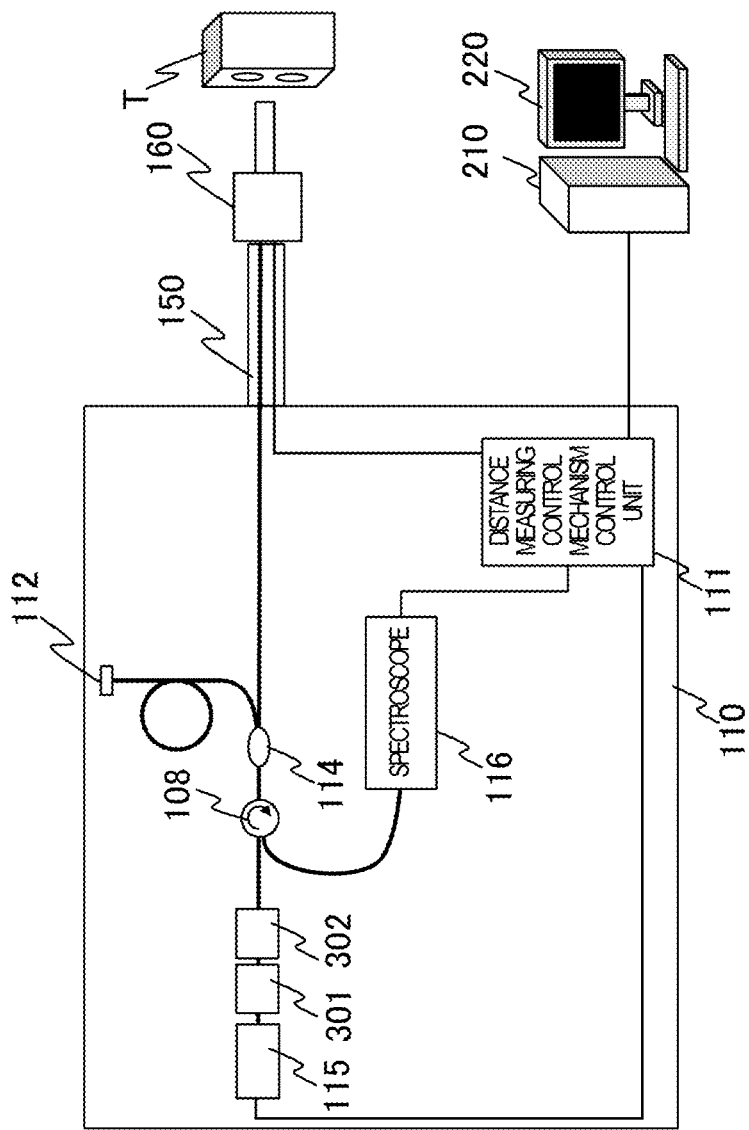
FIG. 8 is a diagram illustrating a second configuration example of the distance measuring control unit.

Next, FIG. 8 illustrates a second configuration example of the distance measuring control unit 110. The second configuration example of the distance measuring control unit 110 measures the distance to the object T using a spectral domain-optical coherence tomography (SD-OCT) (or frequency domain OCT) as a distance measuring method.

The second configuration example of the distance measuring control unit 110 includes the optical circulator 108, the optical fiber coupler 114, the reference mirror 112, the distance measuring control mechanism control unit 111, a broadband light emitting unit 115, a spectroscope 116, the polarization stabilization unit 301, and the linear polarization switching element 302. Among the components of the second configuration example of the distance measuring control unit 110, the components common to the components of the first configuration example (FIG. 6) are given the same reference numerals, and the description thereof will be appropriately omitted.

The broadband light emitting unit 115 generates broadband light as measurement light according to the control from the distance measuring control mechanism control unit 111. The generated measurement light reaches the optical circulator 108 via the polarization stabilization unit 301 and the linear polarization switching element 302, is guided to the optical fiber coupler 114 by the optical circulator 108, and is split into two by the optical fiber coupler 114. One of the split measurement lights is emitted to the object T via the measurement probe 160. In addition, the other of the split measurement lights is reflected by the reference mirror 112 to be a reference light. The measurement light reflected by the object T returns to the distance measuring control unit 110 via the measurement probe 160, is multiplexed with the reference light by the optical fiber coupler 114, is guided to the spectroscope 116 by the optical circulator 108, and the spectrum is analyzed.

This spectrum illustrates oscillations of frequency proportional to the difference in optical path length between the object T and the reference mirror 112. Therefore, the distance measuring control mechanism control unit 111 in the second configuration example realizes the distance measurement of the object T by analyzing this frequency.

<Third Configuration Example of Distance Measuring Control Unit 110>

Figure 9:
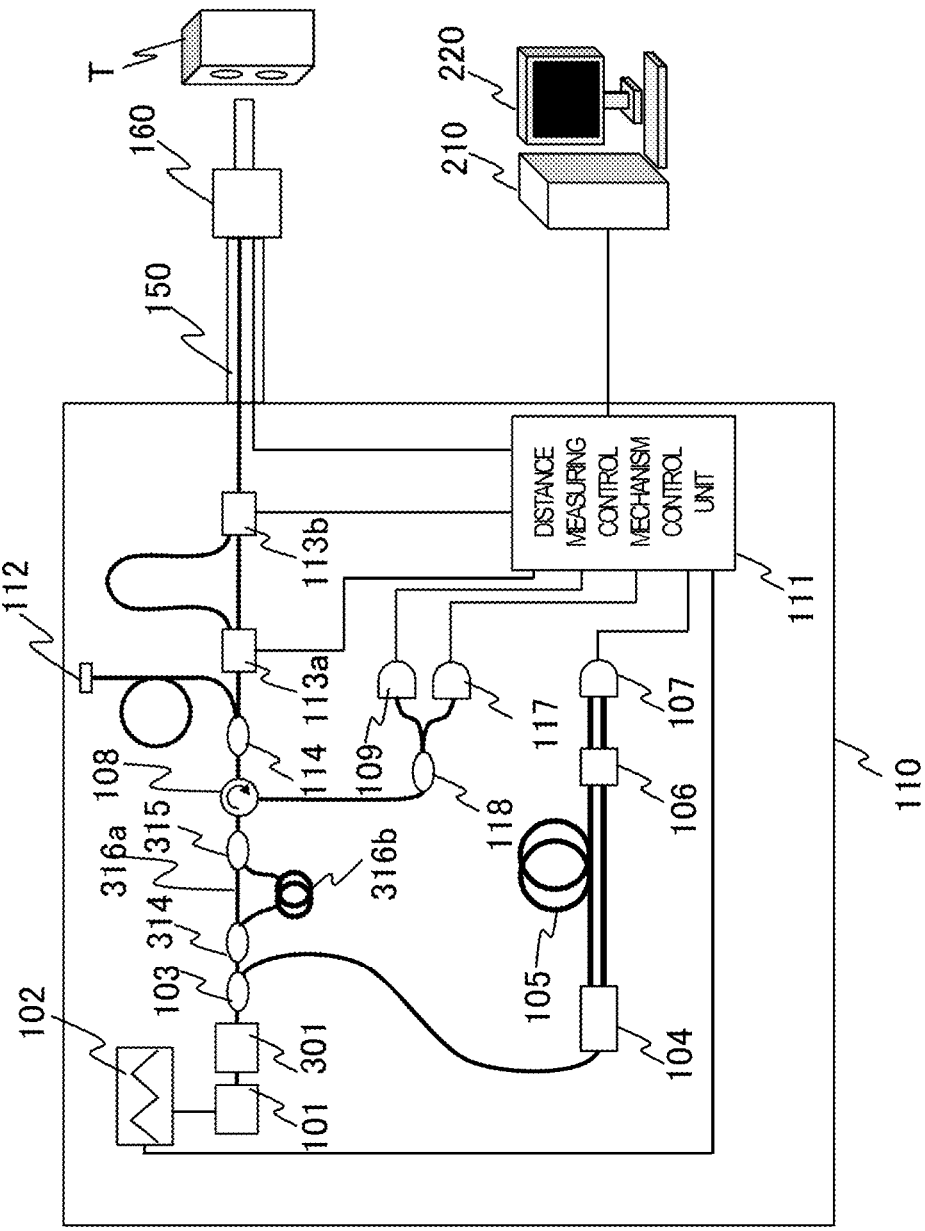
FIG. 9 is a diagram illustrating a third configuration example of the distance measuring control unit.

Next, FIG. 9 illustrates a third configuration example of the distance measuring control unit 110. In the third configuration example of the distance measuring control unit 110, measurement light can be simultaneously emitted in both directions from the measurement probe tip end unit 164 of the measurement probe 160 without switching between the first direction 300*a* and the second direction 300*b*.

Similar to the first configuration example (FIG. 6), the third configuration example of the distance measuring control unit 110 measures the distance to the object T using the spectral domain-optical coherence tomography (SD-OCT) (or frequency domain OCT) as the distance measuring method. Among the components of the third configuration example of the distance measuring control unit 110, the components common to the components of the first configuration example (FIG. 6) are given the same reference numerals, and the description thereof will be appropriately omitted.

In the third configuration example of the distance measuring control unit 110, the linear polarization switching element 302 is omitted from the first configuration example (FIG. 6), optical fiber couplers 314 and 315 between the optical fiber coupler 103 and the optical circulator 108, and the optical fibers 316*a* and 316*b* are added, and a light receiving unit 117 and an optical fiber coupler 118 are added to the rear portion of the optical circulator 108.

The optical fiber coupler 314 splits light, which is output from the polarization stabilization unit 301 and input via the optical fiber coupler 103, in which the linear polarization state in a constant direction is stabilized, split into two. The optical fiber 316*a* guides one of the light split into two by the optical fiber coupler 314 to the optical fiber coupler 315 while maintaining the linear polarization state. The optical fiber 316*b* is adjusted so that the difference between the length thereof and the length of the optical fiber 316*a* is longer than the coherence length of the measurement light. As a result, the interference between the left circularly polarized light 307*a* and the right circularly polarized light 307*b* (FIG. 10) simultaneously output from the first polarization state control unit 165 can be prevented. The optical fiber 316*b* is physically connected to the optical fiber coupler 315 in a state of being twisted by π/2 in comparison with the optical fiber 316*a*. As a result, light of which linear polarization states are orthogonal to each other is incident on the optical fiber coupler 315 via the optical fibers 316*a* and 316*b*. The optical fiber coupler 315 multiplexes the lights of which linear polarization states are orthogonal to each other and outputs the multiplexed light to the optical circulator 108.

The optical fiber coupler 118 splits the light in which the reference light and the measurement light are multiplexed, which are incident from the optical circulator 108, into two, outputs one to the light receiving unit 109, and outputs the other to the light receiving unit 117.

The light receiving unit 109 corresponds to the reflected light from the first direction 300*a* (FIG. 1), and detects a constant reference beat signal proportional to the optical path difference. The light receiving unit 117 corresponds to the reflected light from the second direction 300*b* (FIG. 1), and detects a constant reference beat signal proportional to the optical path difference.

Figure 10:
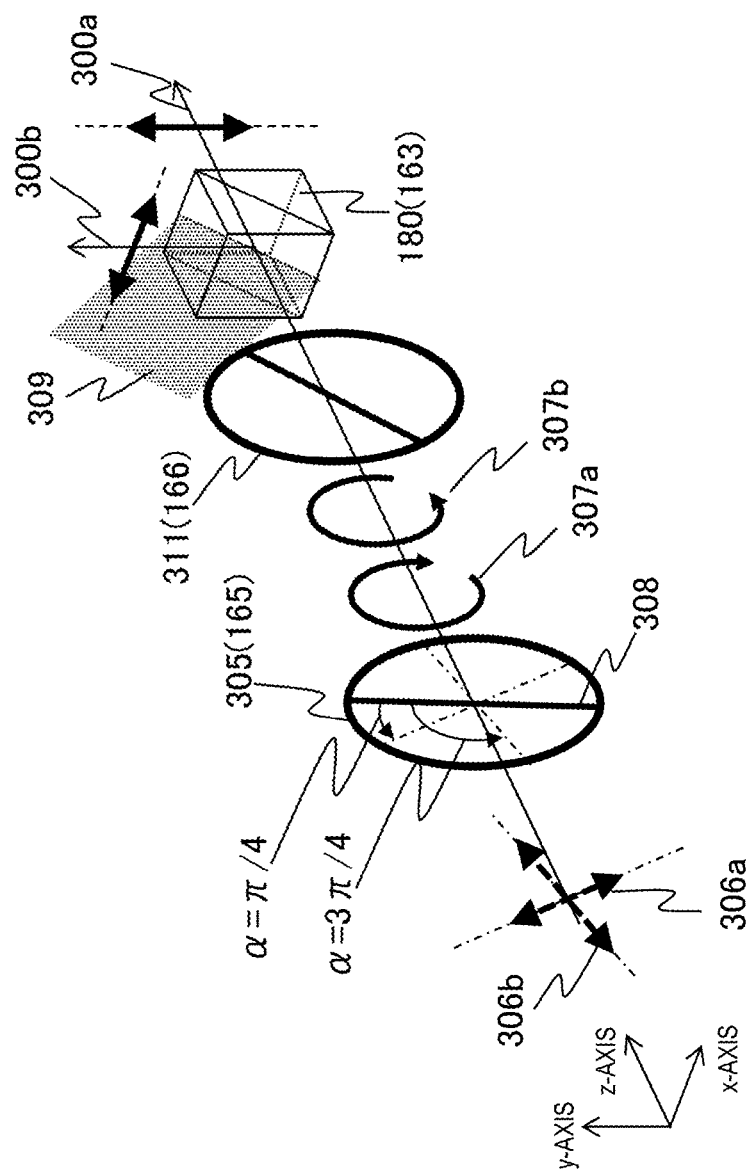
FIG. 10 is a diagram for describing a relationship among the first polarization state control unit, the second polarization state control unit, and the optical path switching element.

Next, FIG. 10 is a diagram for describing the relationship among the first polarization state control unit 165, the second polarization state control unit 166, and the optical path switching element 163 in the third configuration example of the distance measuring control unit 110. However, in FIG. 10, the quarter wavelength plate 305 is adopted as the first polarization state control unit 165, the quarter wavelength plate 311 is adopted as the second polarization state control unit 166, and the polarization beam splitter 180 is adopted as the optical path switching element 163.

In a case where the optical axis of the quarter wavelength plate 305 is used as a reference, as illustrated in FIG. 10, when the measurement light of which linear polarization states are orthogonal to each other is incident on the quarter wavelength plate 305, the circular polarization state (left circularly polarized light) 307*a* that rotates clockwise when the traveling direction is viewed from the quarter wavelength plate 305 and the circular polarization state (right circularly polarized light) 307*b* that rotates counterclockwise when the traveling direction is viewed are simultaneously emitted.

Next, in the quarter wavelength plate 311, the linearly polarized light having an angle of π/4 with respect to the optical axis of the quarter wavelength plate 311 is emitted corresponding to the incident left circularly polarized light 307*a*. The linearly polarized light having an angle of 3π/4 with respect to the optical axis of the quarter wavelength plate 311 is emitted corresponding to the incident right circularly polarized light 307*b*.

The polarization beam splitter 180 disposed on the rear portion of the quarter wavelength plate 311 transmits the linearly polarized light in the oscillation direction parallel to the incident surface 309, that is, emits with the linearly polarized light in the first direction 300*a*. In addition, the polarization beam splitter 180 reflects the linearly polarized light in the oscillation direction having an angle of π/2 with respect to the incident surface 309, which is simultaneously incident, that is, emits with the linearly polarized light in the second direction 300*b*.

Therefore, in the third configuration example of the distance measuring control unit 110, the measurement light can be simultaneously emitted in both directions from the measurement probe tip end unit 164 of the measurement probe 160 without switching between the first direction 300*a* and the second direction 300*b*. The distance measuring control mechanism control unit 111 can calculate the distances to the object T in both the first direction 300*a* and the second direction 300*b* substantially simultaneously.

<Another Configuration Example of Distance Measuring Control Unit 110>

The first configuration example (FIG. 6) and the third configuration example (FIG. 9) of the distance measuring control unit 110 described above adopt FMCW or SS-OCT as the distance measuring method, and the second configuration example (FIG. 8) of the distance measuring control unit 110 adopts SD-OCT as the distance measuring method. Examples of another distance measuring method that may be adopted by the distance measuring control unit 110 include a white confocal method.

In the configuration example of the distance measuring control unit 110 adopting the white confocal method, the reference mirror 112 and the optical fiber coupler 114 are omitted from the second configuration example (FIG. 8), and instead, in the lens unit 161 of the measurement probe 160, a configuration in which chromatic aberration occurs intentionally is adopted, and the measurement probe 160 of which the focal position is different depending on the wavelength of measurement light is used.

In the case of this configuration example, when the light reflected or scattered on the object T is collected again by the lens unit 161 and returned to the distance measuring control unit 110, only wavelengths that are in focus at the distance to the object T are captured. That is, when the light is detected by the spectroscope 116 and the wavelength at which the spectrum reaches the peak is calculated by the distance measuring control mechanism control unit 111, distance measurement of the object T can be realized. According to this configuration example, the detected spectrum data itself can be obtained as the data illustrated in FIG. 7 without performing the FFT on the measurement light.

<First Configuration Example of Three-Dimensional Shape Measuring Apparatus Adopting Distance Measuring Device 10>

Figure 11:
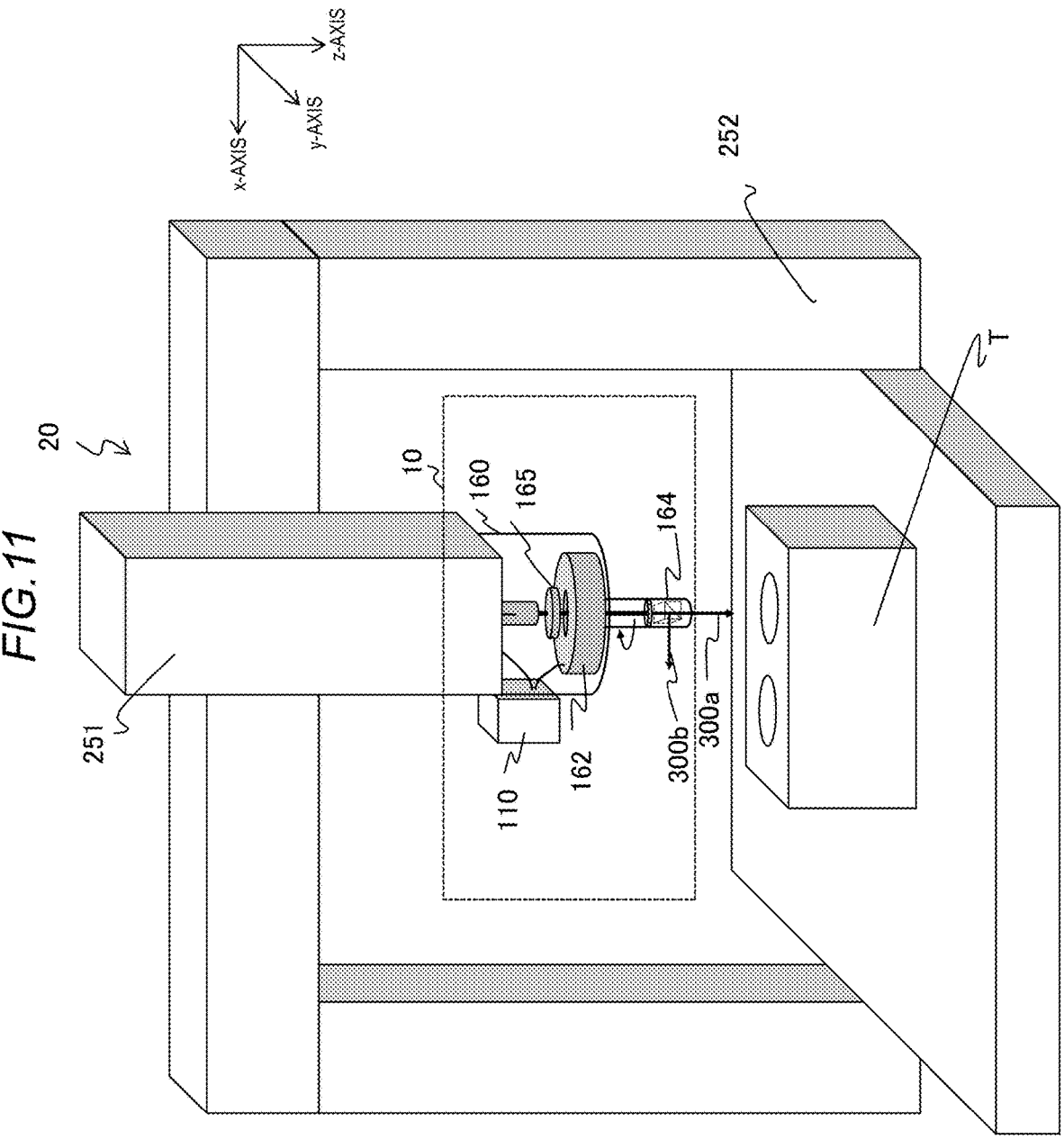
FIG. 11 is a schematic view illustrating a first configuration example of a three-dimensional shape measuring apparatus adopting the distance measuring device.

Next, FIG. 11 is a schematic view illustrating a first configuration example of a three-dimensional shape measuring apparatus 20 adopting the distance measuring device 10. The three-dimensional shape measuring apparatus 20 measures the three-dimensional shape of the object T.

The first configuration example of the three-dimensional shape measuring apparatus 20 includes a moving mechanism 250 (FIG. 13) including an xz-axis moving mechanism 251 and a y-axis moving mechanism 252.

The distance measuring device 10 having the measurement probe 160 is installed in the xz-axis moving mechanism 251. The xz-axis moving mechanism 251 can move in the x-axis direction (horizontal direction in the drawing) and the z-axis direction (vertical direction in the drawing). The measurement probe tip end unit 164 of the measurement probe 160 also moves along with the movement of the xz-axis moving mechanism 251. The y-axis moving mechanism 252 is a gate-shaped structure, and can move in the y-axis direction (depth direction in the drawing). The y-axis moving mechanism 252 supports the xz-axis moving mechanism 251, and the measurement probe tip end unit 164 of the measurement probe 160 supported by the xz-axis moving mechanism 251 also moves along with the movement of the y-axis moving mechanism 252. Therefore, according to the xz-axis moving mechanism 251 and the y-axis moving mechanism 252, the posture of the object T in three degrees of freedom can be controlled.

The configuration of the moving mechanism is not limited to the configuration m described above, and any configuration that can move the measurement probe tip end unit 164 in three axial directions may be used. For example, a configuration that moves the measurement probe tip end unit 164 in three axial directions may be used by installing only the measurement probe 160 in the xz-axis moving mechanism 251 without installing the distance measuring control unit 110 in the xz-axis moving mechanism 251.

The three-dimensional shape measuring apparatus 20 has a normal axis configuration used in a three-dimensional measuring apparatus, and it is possible to realize highly functional non-contact shape measurement by installing the measurement probe 160 of the distance measuring device 10 instead of the probe of the three-dimensional measuring apparatus.

In addition, in a normal three-axis processing machine, the Z-axis is provided on the tool side, and the x-axis and y-axis are provided on the object T side in many cases, and the configuration is different from that of the three-dimensional shape measuring apparatus 20 in FIG. 11. However, when the measurement probe 160 is installed in the three-axis processing machine, on-machine measurement on the processing machine can be realized.

In addition, when the measurement probe 160 is installed in a multi-degree of freedom robot and the measurement probe tip end unit 164 is moved, a three-dimensional shape measuring apparatus 20 capable of measurement with a high degree of freedom can be realized.

<Second Configuration Example of Three-Dimensional Shape Measuring Apparatus Adopting Distance Measuring Device 10>

Figure 12:
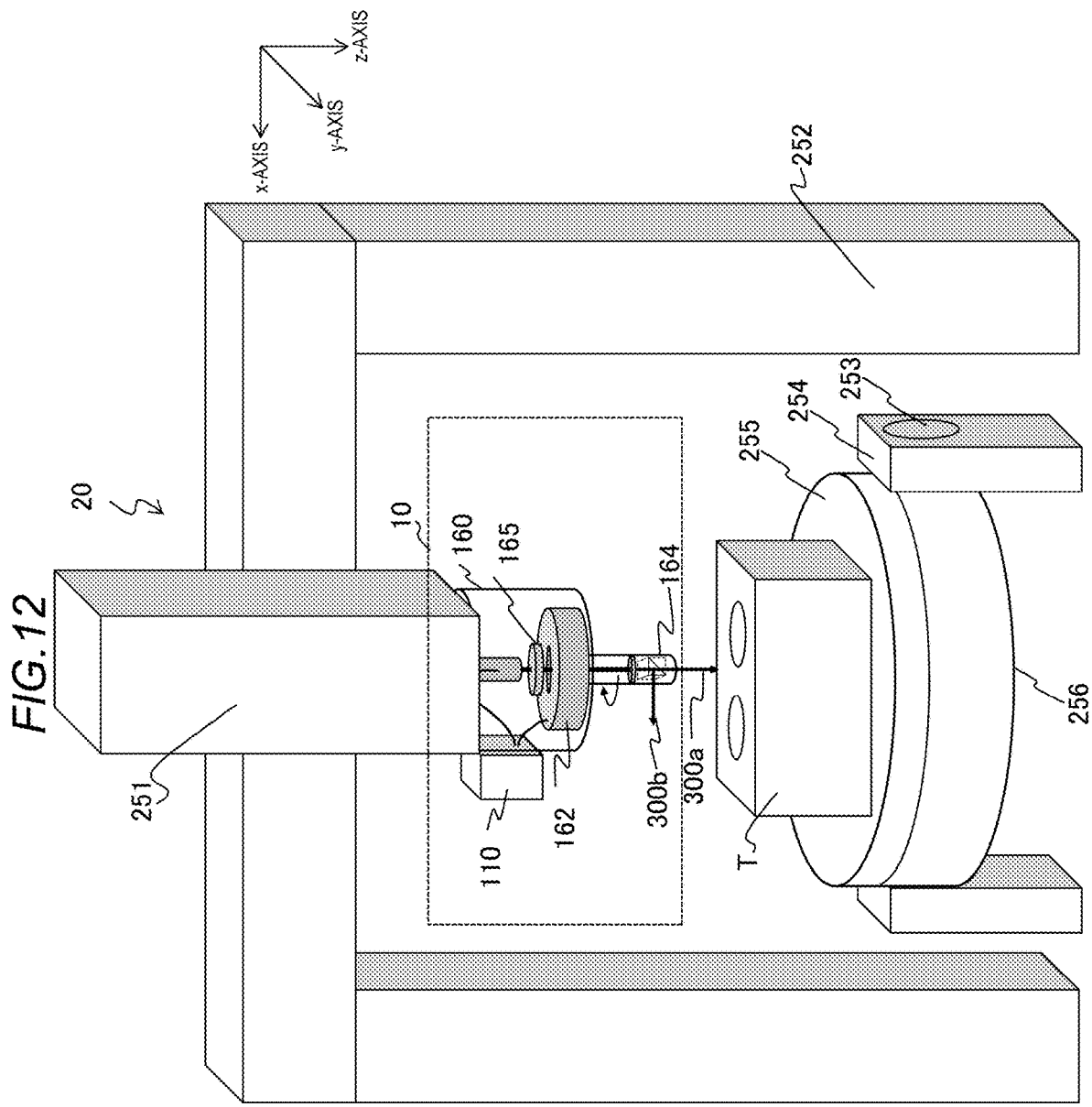
FIG. 12 is a schematic view illustrating a second configuration example of the three-dimensional shape measuring apparatus adopting the distance measuring device.

Next, FIG. 12 is a schematic view illustrating a second configuration example of the three-dimensional shape measuring apparatus 20 adopting the distance measuring device 10. In the second configuration example, a rotation mechanism 256 is added to the first configuration example (FIG. 11). That is, the second configuration example of the three-dimensional shape measuring apparatus 20 includes the moving mechanism 250 (FIG. 13) including the xz-axis moving mechanism 251, the y-axis moving mechanism 252, and the rotation mechanism 256.

The rotation mechanism 256 is locked by the rotation axis 253 supported by the structure 254, and rotates about the rotation axis 253 parallel to the xy plane. In addition, the rotation mechanism 256 rotates about the rotation shaft which is a rotation shaft (not illustrated) orthogonal to the rotation axis 253 and parallel to the z-axis.

A sample stage 255 is installed on the rotation mechanism 256, and the sample stage 255 rotates as the rotation mechanism 256 rotates. As a result, the object T placed on the sample stage 255 rotationally moves. Therefore, according to the rotation mechanism 256, the posture of the object T in two degrees of freedom can be controlled.

That is, the second configuration example of the three-dimensional shape measuring apparatus 20 not only can control the relative position three degrees of freedom between the measurement probe 160 and the object T using the xz-axis moving mechanism 251 and the y-axis moving mechanism 252, but also can control the relative position two degrees of freedom using the rotation mechanism 256, so that a total of five degrees of freedom can be controlled. As a result, it is possible to measure every part of the object T from all directions.

By installing the measurement probe 160 in a normal five-axis processing machine, it is possible to realize on-machine measurement on the processing machine. In addition, since the number and the configuration of the degrees of freedom differ depending on the processing machine, the configuration of the three-dimensional shape measuring apparatus 20 is not limited to the first configuration example illustrated in FIG. 11 and the second configuration example illustrated in FIG. 12.

Figure 13:
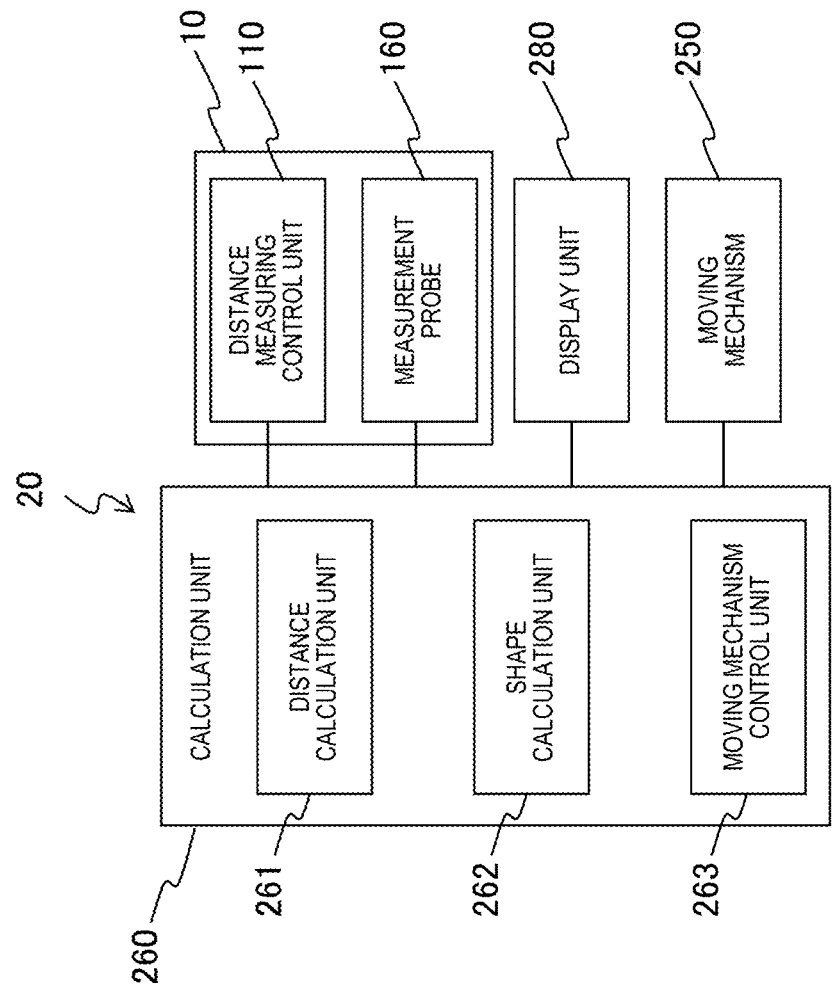
FIG. 13 is a diagram illustrating an example of functional blocks of the three-dimensional shape measuring apparatus.

Next, FIG. 13 is a diagram illustrating an example of functional blocks of the three-dimensional shape measuring apparatus 20. The three-dimensional shape measuring apparatus 20 is provided with a calculation unit 260, the distance measuring control unit 110, the measurement probe 160, a display unit 280, and the moving mechanism 250. The distance measuring control unit 110 and the measurement probe 160 correspond to the distance measuring device 10.

The calculation unit 260 generally controls entire three-dimensional shape measuring processing using a calculation device such as a central processing unit (CPU). The display unit 280 includes a display device that displays the measurement result.

The calculation unit 260 includes the distance calculation unit 261, a shape calculation unit 262, and a moving mechanism control unit 263. The distance calculation unit 261 analyzes the measurement beat signal and the reference beat signal received by the distance measuring control unit 110, and converts the signals into a distance. In addition, the distance calculation unit 261 controls the measurement probe 160 to control the rotation angle of the measurement probe tip end unit 164.

The shape calculation unit 262 measures the shape of the object T using data notified from the distance calculation unit 261. The data notified from the distance calculation unit 261 includes data in the detection direction of the measurement light. The shape calculation unit 262 allows the display unit 280 to display the measured shape of the object T.

The moving mechanism control unit 263 controls the moving mechanism 250 to control the relative position between the measurement probe 160 and the object T. The position and posture of the object T controlled by the moving mechanism control unit 263 are notified to the distance calculation unit 261. The calculation unit 260 may be installed in the distance measuring control unit 110 or the measurement probe 160.

Hereinbefore, although each embodiment and modification according to the present invention are described, the present invention is not limited to an example of the embodiment described above, and includes various modifications. For example, the example of the embodiment described above is described in detail in order to make the present invention easy to understand, and the present invention is not limited to one provided with all the configurations described here. In addition, a portion of the configuration of the example of the embodiment can be replaced with a configuration of another example. In addition, the configuration of another example can be added to the configuration of the example of the embodiment. In addition, another configuration can be added, deleted, or replaced to a portion of the configuration of the example of each embodiment. In addition, each of the configurations, functions, processing units, processing means described above may be realized by hardware, for example, by designing a portion or all of these with an integrated circuit. In addition, control lines and information lines in the drawings indicate what is considered to be necessary for the description, and do not necessarily indicate all. It may be considered that substantially all configurations are connected to each other.

In addition, the configuration of the inspection apparatus described above can also be classified into more components according to processing content. In addition, one component can be classified to perform more processing.

REFERENCE SIGNS LIST

10: distance measuring device
20: three-dimensional shape measuring apparatus
101: light emitting unit
102: oscillating unit
103, 104: optical fiber coupler
105: optical fiber
106: optical fiber coupler
107: light receiving unit
108: optical circulator
109: light receiving unit
110: distance measuring control unit
111: distance measuring control mechanism control unit
112: reference mirror
113a, 113b: optical switch
114: optical fiber coupler
115: broadband light emitting unit
116: spectroscope
117: light receiving unit
118: optical fiber coupler
150: connection cable
160: measurement probe
161: lens unit
162: rotation unit
163: optical path switching element
164: measurement probe tip end unit
165: first polarization state control unit
166: second polarization state control unit
180: polarization beam splitter
181: birefringence plate
182: mirror
210: control device
220: display device
250: moving mechanism
251: xz-axis moving mechanism
252: y-axis moving mechanism
253: rotation axis
254: structure
255: sample stage
256: rotation mechanism
260: calculation unit
261: distance calculation unit
262: shape calculation unit
263: moving mechanism control unit
280: display unit
300a: first direction
300b: second direction
301: polarization stabilization unit
302: linear polarization switching element
305: quarter wavelength plate
306a: first measurement light oscillation direction
306b: second measurement light oscillation direction
307a: left circularly polarized light
307b: right circularly polarized light
311: quarter wavelength plate
314: optical fiber coupler
315: optical fiber coupler
316a, 316b: optical fiber

The invention claimed is:
1. A distance measuring device comprising:
a semiconductor laser that emits a measurement light based on a oscillating wave;
a first optical switch that receives a linearly polarized light that is formed by linearly polarizing the measurement light and selectively outputs a switched light, wherein in the switched light is the linearly polarized light rotated by $\pi/2$;
a first beam splitter that receives the switched light from the first optical switch and splits the switched light into a first beam and a second beam, wherein the first beam is received by an optical reference system;
a second beam splitter that receives the second beam from the first beam splitter and splits the second beam into a third beam and fourth beam,
a mirror that reflects the third beam to generate a reference light; and
a measurement probe that receives the fourth beam, wherein the measurement probe includes:
a first liquid crystal element that receives the fourth beam and outputs a first controlled beam, wherein the first controlled beam is formed by controlling a polarization state of the fourth beam,
a second liquid crystal element that receives the first controlled beam and outputs a second controlled beam, wherein the second controlled beam is formed by controlling a polarization state of the first controlled beam; and a second optical switch that selects an emission direction of the second controlled beam, outputs an emitted measurement light and receives a reflected light obtained by reflecting the emitted measurement light by an object, wherein the polarization state of the second controlled beam is controlled so that emitted measurement light is emitted in a plurality of the emission directions.

2. The distance measuring device according to claim 1, wherein the second optical switch emits the emitted measurement light in a first direction by transmitting the measurement light, and emits the emitted measurement light in a second direction substantially perpendicular to the first direction by reflecting the measurement light.

3. The distance measuring device according to claim 2, wherein
the second liquid crystal element and the second optical switch are configured to rotate about a rotation axis parallel to the first direction.

4. The distance measuring device according to claim 3, wherein the first liquid crystal element is fixed without being able to rotate about the rotation axis parallel to the first direction.

5. The distance measuring device according to claim 1, wherein the first controlled beam is a a circularly polarized light,
the second optical switch selects the emission direction of the emitted measurement light according to a direction of the linearly polarized light in the second controlled beam.

6. The distance measuring device according to claim 1, further comprising:
a computer that measures a distance to the object by measuring a propagation time of the emitted measurement light.

7. The distance measuring device according to claim 1, wherein the first optical switch or the second optical switch are formed of a polarization beam splitter or a combination of a birefringence prism and a mirror.

8. The distance measuring device of claim 1, wherein:
the second optical switch is configured to move multiple directions including an x-axis direction, an y-axis direction, and a z-axis direction orthogonal to one another.

9. A distance measuring method, the method comprising:
emitting, by a semiconductor laser, a measurement light based on a oscillating wave;
receiving, by a first optical switch, a linearly polarized light that is formed by linearly polarizing the measurement light;
selectively outputting, by the first optical switch, a switched light, wherein the switched light is the linearly polarized light rotated by $\pi/2$;
splitting, by a first beam splitter, the switched light received from the first optical switch into a first beam and a second beam, wherein the first beam is received by an optical reference system;
splitting, by a second beam splitter, the second beam into a third beam and fourth beam,
generating, by a mirror, a reference light by reflecting the third beam; and
measuring, by a measurement probe, a distance to an object based on the fourth beam, wherein the measurement probe includes:
a first liquid crystal element that receives the fourth beam and outputs a first controlled beam, wherein the first controlled beam is formed by controlling a polarization state of the fourth beam,
a second liquid crystal element that receives the first controlled beam and outputs a second controlled beam, wherein the second controlled beam is formed by controlling a polarization state of the first controlled beam; and
a second optical switch that selects an emission direction of the second controlled beam, outputs an emitted measurement light and receives a reflected light obtained by reflecting the emitted measurement light by the object, wherein the polarization state of the second controlled beam is controlled so that emitted measurement light is emitted in a plurality of the emission directions.

* * * * *